(12) United States Patent
Ruud et al.

(10) Patent No.: US 11,321,803 B2
(45) Date of Patent: May 3, 2022

(54) GRAPHICS PROCESSING PRIMITIVE PATCH TESTING

(71) Applicant: Arm Limited, Cambridge (GB)

(72) Inventors: Ole Magnus Ruud, Trondheim (NO); Bjarne Drotninghaug, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/010,247

(22) Filed: Sep. 2, 2020

(65) Prior Publication Data
US 2022/0067871 A1 Mar. 3, 2022

(51) Int. Cl.
*G06T 1/20* (2006.01)
*G06T 1/60* (2006.01)
*G06T 7/00* (2017.01)
*G06T 15/00* (2011.01)
*G06T 17/10* (2006.01)

(52) U.S. Cl.
CPC ............ *G06T 1/20* (2013.01); *G06T 1/60* (2013.01); *G06T 7/0002* (2013.01); *G06T 15/005* (2013.01); *G06T 17/10* (2013.01)

(58) Field of Classification Search
CPC ........... G06T 1/20; G06T 15/005; G06T 1/60; G06T 17/10; G06T 7/0002
See application file for complete search history.

(56) References Cited

U.S. PATENT DOCUMENTS

2017/0309027 A1* 10/2017 Kleen .................... G06T 15/40
2018/0144538 A1* 5/2018 Jeong .................... G06T 11/001
2019/0188896 A1* 6/2019 Heggelund ............... G06T 1/20

\* cited by examiner

*Primary Examiner* — Jennifer Mehmood
*Assistant Examiner* — Donna J. Ricks
(74) *Attorney, Agent, or Firm* — Vierra Magen Marcus LLP

(57) ABSTRACT

A method of operating a tile-based graphics processor that can use one of plural different rendering tile sizes is disclosed. The tile-based graphics processor includes a rasteriser that can rasterise primitives in a hierarchical manner. A patch size at which to begin the hierarchical testing of primitives in the rasteriser is selected based on the rendering tile size that is to be used. This can reduce the overall number of tests performed to rasterise primitives without impacting the correct functioning of the hierarchical rasterisation process.

17 Claims, 7 Drawing Sheets

GRAPHICS PROCESSING PRIMITIVE PATCH TESTING

BACKGROUND

The technology described herein relates to computer graphics processing, and in particular to processing graphics primitives to generate a render output in a computer graphics processing system.

Graphics processing is normally carried out by first splitting the desired render output, e.g. the frame to be displayed, into a number of similar basic components or "primitives", which primitives are then subjected to the desired graphics processing operations. The graphics primitives are usually in the form of simple polygons, such as triangles or quadrilaterals, or points or lines.

Each primitive is usually defined by and represented as a set of vertices. Each vertex for a primitive has associated with it a set of data (such as position, colour, texture and other attributes data) representing the vertex. This data is then used, e.g., when rasterising and rendering the primitive(s) to which the vertex relates, e.g. for display.

Once primitives and their vertices have been generated and defined, they can be processed by the graphics processing system, in order, e.g., to render the frame.

This process basically involves determining which sampling positions of an array of sampling positions covering the output area to be processed are covered by a primitive, and then determining the appearance that each sampling point should have (e.g. in terms of its colour, etc.) to represent the primitive at that sampling position. These processes are commonly referred to as rasterising and rendering, respectively.

The rasterising process typically determines the sampling points that should be used for a primitive (i.e. the (x, y) sampling positions for sampling points to be used to represent the primitive in the render output, e.g. frame to be displayed).

The rendering process then derives the data, such as red, green and blue (RGB) colour values and an "Alpha" (transparency) value, necessary to represent the primitive at the sampling positions (i.e. "shades" each sampling point). This can involve applying textures, blending sampling point data values, etc.

In 3D graphics literature, the term "rasterisation" is sometimes used to mean both primitive conversion to sampling points and rendering. However, herein "rasterisation" will be used to refer to converting primitive data to sampling point positions only.

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

Each fragment will typically have "fragment data", such as colour, depth and/or transparency data, associated with it, with the fragment data for a given fragment typically being derived from primitive data associated with (the vertices of) the primitive to which the fragment relates.

A "fragment" is therefore effectively (has associated with it) a set of primitive data as interpolated to a given output space sample point or points of a primitive. It may also include per-primitive and other state data that is required to shade the primitive at the sample point (fragment position) in question. Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing are carried out on the rendered image prior to displaying the final image.

It is also the case that as multiple fragments, e.g. from different overlapping primitives, at a given location may affect each other (e.g. due to transparency and/or blending), the final pixel output may depend upon plural or all fragments at that pixel location.

Correspondingly, there may be a one-to-one correspondence between the sampling points and the pixels of a display, but more typically there may not be a one-to-one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.

The rasterisation process thus basically maps the primitives defining the render output to be generated to the sampling points that will be used to render the output. This is typically done by determining, for each sampling point, whether the sampling point position is covered by the primitive in question or not. This determination is typically done by testing the sampling points' positions against the edges of the primitive, to see if the sampling points are covered by the primitive. To do this, graphics processing systems typically derive (line) equations representing each of the edges of a primitive (e.g. using the defined vertices of the primitive), and then test the sampling points' positions using these edge equations. If a sampling point "passes" the edge test, it is taken to be within the primitive.

The rasterisation process is typically carried out by testing sets of one or more sampling points. For each set of one or more sampling points found to include a sampling point that is covered by the primitive in question (being tested), a discrete graphical entity usually referred to as a graphics "fragment", on which the graphics processing operations (such as rendering) are to be carried out, is then generated by the rasteriser and sent to the rest of the graphics processing pipeline (such as the renderer) for processing.

The Applicants believe there remains scope for improvements to rasterisation operations in graphics processing.

BRIEF DESCRIPTION OF THE DRAWINGS

Various embodiments of the technology described herein will now be described by way of example only and with reference to the accompanying drawings, in which.

Like reference numerals are used for like components where appropriate in the drawings.

DETAILED DESCRIPTION

Figure 1:
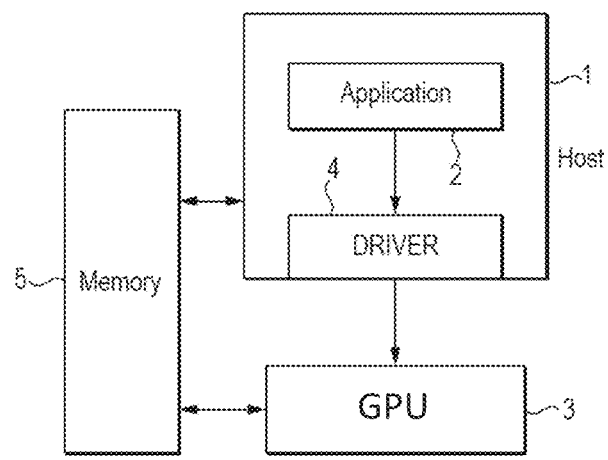
FIG. 1 shows an exemplary graphics processing system.

A first embodiment of the technology described herein comprises a method of operating a tile-based graphics processor that is operable to generate a render output by generating a plurality of rendering tiles that together form the render output, and in which the rendering tile size to be used when generating a render output can be selected from a largest rendering tile size and one or more smaller rendering tile sizes;

wherein the tile-based graphics processor comprises a rasteriser that is operable to test primitives to be rasterised against progressively smaller patches of a render output beginning from a largest patch size;

the method comprising, when generating a render output:

selecting, based on the rendering tile size to be used when generating the render output, a patch size at which to begin the testing of primitives for the render output in the rasteriser; and the rasteriser, for each primitive to be rasterised for the render output, beginning the testing of the primitive at the selected patch size.

A second embodiment of the technology described herein comprises a tile-based graphics processor that is operable to generate a render output by generating a plurality of rendering tiles that together form the render output, and in which the rendering tile size to be used when generating a render output can be selected from a largest rendering tile size and one or more smaller rendering tile sizes, the tile-based graphics processor comprising:

a rasteriser operable to test primitives to be rasterised against progressively smaller patches of a render output beginning from a largest patch size; and a control circuit configured to select, based on the rendering tile size to be used when generating a render output, a patch size at which to begin the testing of primitives for the render output in the rasteriser; and to cause the rasteriser to begin the testing of primitives for the render output at the selected patch size.

The technology described herein is concerned with tile-based graphics processing, in which a (e.g., two-dimensional) render output, e.g. frame for display, is rendered as a plurality of smaller area sub-regions, referred to as "tiles". The rendering tiles should be, and in an embodiment are, each rendered separately (e.g., one after another, (simultaneously) using different processing cores, etc.) by the tile-based graphics processor, and then combined to provide the complete render output (e.g. frame for display).

Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques.

In the technology described herein, the tile-based graphics processor is able to use one of plural possible different rendering tile sizes when generating a render output, e.g. frame for display. That is, the area of the render output that each rendering tile making up the render output represents can vary. In this regard, the Applicants have recognised that it may sometimes be desirable to vary the tile size that is used when generating a render output, e.g. frame for display.

In particular, the Applicants have recognised that it may sometimes be desirable to generate a render output using a rendering mode that effectively increases the amount of storage required in the tile buffer per unit area of the render output. However, increasing the amount of storage used per unit area of the render output in the tile buffer may increase the overall amount of data to be stored in the tile buffer for a single rendering tile to beyond the storage capacity of the tile buffer. In such cases, reducing the rendering tile size, i.e. reducing the area of the render output that each tile represents, may avoid the storage limitations of the tile buffer, and thus facilitate such more storage intensive rendering modes.

Such situations may occur, for example, when using multisampling, since increasing the level of multisampling effectively increases the number of sample values associated with each (e.g. display) pixel, such that the storage required per unit area of the render output in the tile buffer increases. Similarly, using more bits per sample value can increase the storage required per unit area of the render output in the tile buffer. Furthermore, the storage available for a tile in the tile buffer can decrease when rendering to multiple render targets simultaneously.

In the technology described herein, the tile-based graphics processor can generate a render output using either a largest possible rendering tile size, or one of one or more smaller rendering tile sizes. The largest possible rendering tile size in an embodiment corresponds to the largest rendering tile size that can be accommodated by the tile buffer, for example when using an expected rendering mode, and the one or more smaller rendering tile sizes then facilitate the use of more storage intensive rendering modes.

The tile-based graphics processor of the technology described herein includes a rasteriser that is operable to test primitives to be rasterised against progressively smaller patches (regions) of the render output area, e.g. and in an embodiment, in an iterative manner. That is, the rasteriser can perform "hierarchical" rasterisation. Thus, a primitive to be rasterised can be first tested by the rasteriser against a largest patch of the render output, to determine if the primitive covers (at least in part) any smaller patches of the render output that the largest patch encompasses. If the primitive does cover (at least in part) any smaller patches of the render output that the largest patch encompasses, then the largest patch may be subdivided into those smaller patches, and the process may then be repeated for each smaller patch of the render output that was found to be at least partially covered by the primitive, until a minimum or smallest patch size is reached. The smallest patch may then be sample tested to determine which sampling points, and thus fragments, for that patch are covered by the primitive, and the covered fragments may be output by the rasteriser for further processing (e.g. rendering (shading)) by the graphics processor.

While it would be possible for the rasteriser to always begin testing primitives from a largest supported patch size in this manner, the Applicants have recognised that it is not necessary to perform hierarchical rasterisation patch tests in which a primitive is tested against a patch that is larger than the size of the rendering tile size that is being used, and accordingly that any hierarchical rasterisation iterations that involve such patch tests can be omitted without impacting the correct functioning of the hierarchical rasterisation process.

The technology described herein exploits this and facilitates the omitting of such unnecessary patch tests in a tile-based graphics processor that can use one of plural possible different rendering tile sizes by beginning hierarchical rasterisation from a patch size selected based on, and in an embodiment corresponding to, the rendering tile size that is actually being used.

Thus, for example, and in an embodiment, when one of the one or more smaller rendering tile sizes is being used, the rasteriser begins hierarchical rasterisation at a selected patch size that is smaller than the largest supported patch size of the rasteriser.

The rasteriser may accordingly only test primitives against patches that are the same size or smaller than the selected size, and any patch tests in which a primitive would be tested against a patch that is larger than the selected patch size (and that is, e.g., larger than the rendering tile size that is actually being used) are omitted.

This means that (when possible) the number of patch tests performed by the rasteriser can be reduced, e.g. as compared to always starting hierarchical rasterisation from the largest supported patch size, irrespective of the rendering tile size that is actually being used. Accordingly, the efficiency with which rasterisation is performed can be increased. This is generally advantageous, but may be particularly advantageous in contexts in which resources are limited, such as in portable devices, e.g. mobile phones and tablets.

It will be appreciated, therefore, that the technology described herein provides an improved tile-based graphics processor.

The tile-based graphics processor of the technology described herein generates a render output by generating a plurality of rendering tiles that together form the render output.

The render output may comprise any suitable render output, such as frame for display, or render-to-texture output, etc. In an embodiment, the render output is an output frame in a sequence of plural output frames that the graphics processor generates. In this case, each output frame is in an embodiment generated in the manner of the technology described herein.

The render output will typically comprise an array of data elements (sampling points) (e.g. pixels), for each of which appropriate render output data (e.g. a set of colour value data) is generated. The data may comprise, for example, a set of red, green and blue, RGB values and a transparency (alpha, a) value.

The render output may be generated for display on a display device having a display or output comprising a plurality of pixels, such as a computer monitor or a printer. The render output may accordingly include, for each output pixel of the display device, a set of one or more corresponding data elements (sampling points). Each such set of data elements (sampling points) may include only a single data element (sampling point). Alternatively, each set of data elements may include plural data elements (sampling points). In this latter case, each sampling point may effectively correspond to a part of a pixel (e.g. a sub-pixel) of the display device, and the render output may be subjected to an appropriate downsampling operation to generate the output pixel values for displaying the final image on the display device.

The tiles that a render output is divided into can be any suitable and desired such tiles. The rendering tiles that any one render output is divided into are in an embodiment all the same size and shape (i.e. regularly-sized and shaped tiles are in an embodiment used for a (each) render output). The rendering tile size may be the same or different for different render outputs.

A rendering tile size should, and in an embodiment does, refer to the area of the render output that a rendering tile represents. The rendering tile size (and shape) may typically be expressed in terms of the number of fragments that a tile represents. For example, a rendering tile having an m×m rendering tile size will be a square rendering tile size representing a block of m×m fragments (and in the case that each fragment is the same size and location as a pixel of the output, the rendering tile will represent m×m output pixels). As discussed above, each such fragment may be associated with a single or a set of plural sampling points in the render output, e.g. depending on the rendering mode being used.

In an embodiment, the largest rendering tile size and the one or more smaller rendering tile sizes form a set of possible rendering tile sizes that the graphics processor supports and can use to generate any particular render output. In an embodiment, each possible rendering tile size (shape) in the set of possible render tile sizes is rectangular, such as square. For example and in an embodiment, each rendering tile size is either a square or a rectangle made up of two equal squares. That is, the rendering tiles may have a size of either m×m or 2m×m fragments (pixels), where m is a positive integer, and is in an embodiment a power of 2. For example and in an embodiment, the largest rendering tile size is 16×16, and the one or more smaller rendering tile sizes include one or more, and in an embodiment each, of 16×8, 8×8, 8×4 and 4×4. In an embodiment, the largest rendering tile size is 32×32, and the one or more smaller rendering tile sizes include one or more, and in an embodiment each, of 32×16, 16×16, 16×8, 8×8, 8×4 and 4×4. Other arrangements would be possible.

As discussed above, the largest possible rendering tile size in the set of possible rendering tiles sizes in an embodiment corresponds to the largest possible rendering tile that can be accommodated by the tile buffer (when using an expected rendering mode).

To facilitate tile-based graphics processing, the tile-based graphics processor should, and in an embodiment does, include one or more tile buffers that store rendered data for a rendering tile being rendered by the tile-based graphics processor, until the tile-based graphics processor completes the rendering of the rendering tile.

The tile buffer may store an array or arrays of sample values for the tile in question, with the sample values in an embodiment being grouped into sets of sample values (such as groups of 2×2 sample values) that are each associated with a respective (e.g. display) pixel. The sample values may, e.g., comprise colour values (a colour buffer), depth values (a depth buffer), etc.

The tile buffer should be, and in an embodiment is, provided local to (i.e. on the same chip as) the tile-based graphics processor, for example, and in an embodiment, as part of RAM that is located on (local to) the graphics processor (chip). The tile buffer may accordingly have a fixed storage capacity, for example corresponding to the data (e.g. for an array or arrays of sample values) that the tile-based graphics processor needs to store for (only) a single rendering tile until the rendering of that tile is completed.

Once a rendering tile is completed by the tile-based graphics processor, rendered data for the rendering tile should be, and in an embodiment is, written out from the tile buffer to other storage that is in an embodiment external to (i.e. on a different chip to) the tile-based graphics processor, such as a frame buffer in external memory, for use.

Rendering tiles may be combined to form the render output in any suitable and desired manner. In an embodiment, when each rendering tile of a render output is completed by the graphics processor, rendered data for the rendering tile is written out from the tile buffer to external memory, such as a frame buffer, such that rendering tiles for the render output are combined in the external memory. The graphics processor in an embodiment includes a write out circuit coupled to the tile buffer for this purpose.

The graphics processor may also be provided with a downsampling circuit for downsampling the locally stored tile buffer data before it is written out to external memory where that is required (as may, e.g., be the case where a frame to be displayed is rendered in a supersampled or multisampled manner for anti-aliasing purposes).

The external memory should be on a different chip to the graphics processor, and may, for example, be a main memory of the overall graphics processing system that the graphics processor is part of. It may be dedicated memory for this purpose or it may be part of a memory that is used for other data as well.

The rendering tile size that is actually to be used to generate the render output can be chosen in any suitable and desired manner. In an embodiment, the rendering tile size to use is selected based on the size of the tile buffer and the per-tile storage requirements for the rendering mode to be used to generate the render output. In an embodiment, this selection is done by a driver for the graphics processor that is in an embodiment executed by a host processor of the graphics processing system.

The rasteriser of the technology described herein is operable to test primitives to be rasterised against progressively smaller sized patches of a render output, beginning from a largest patch size, in a hierarchical manner.

To do this, in an embodiment, the rasteriser supports a set of plural possible different patch sizes (areas) that patches that the rasteriser can test a primitive against can have, which set of plural possible patch sizes (areas) includes the largest patch size, and one or more smaller patch sizes, including a smallest patch size.

Thus, the rasteriser is in an embodiment operable to test a primitive to be rasterised against a largest possible patch (region) of a render output that encompasses an area of the render output having the largest (supported) patch size and then, if appropriate, against one or more smaller patches of the render output that each encompass an area of the render output having a respective one of the one or more smaller (supported) patch sizes, in an embodiment until all patches are discarded or until the smallest patch size is reached.

The rasteriser may be operable to test primitives against any suitable shaped patches. In an embodiment, the shapes of patches that the rasteriser can test primitives against are tailored to cover the rendering tiles that the graphics processor can use. For example, and in an embodiment, the rasteriser supports (only) rectangular, in an embodiment square, patches.

The largest possible patch size (area) (in the set of possible patch sizes) can be selected as desired. It would be possible for a largest possible patch supported by the rasteriser to encompass an area of the render output that is larger than or smaller than the largest rendering tile size that the graphics processor can use. However, in an embodiment, the largest patch size exactly matches (is equal to) the largest possible rendering tile size. Thus, in an embodiment, the rasteriser can begin the testing of a primitive from a patch that encompasses the same area of a render output as the largest possible rendering tile (and to then iteratively test the primitive against progressively smaller sized patches as appropriate, i.e. in a hierarchical manner).

The one or more smaller patch sizes (areas) (in the set of possible patch sizes) can be selected as desired. In an embodiment, each smaller patch in the set of possible patch sizes encompasses a particular, in an embodiment selected, in an embodiment predetermined fraction of the area of the render output that the next larger patch in the set of possible patch sizes encompasses. In one such embodiment, where each possible patch encompasses a rectangular, in an embodiment square, area of the render output, each smaller patch encompasses a quarter of the area of the render output that the next larger patch encompasses. Thus, in an embodiment, the set of patch sizes supported by the rasteriser is such that a larger patch encompasses a set of in an embodiment four (2×2) smaller patches.

The smallest patch size (in the set of possible patch sizes) can be selected as desired. In an embodiment, the rasteriser comprises a sample tester operable to sample test patches of the render output having a particular patch size to determine which sampling points, and thus fragments, for that patch are covered by a primitive, and to generate the fragments to be output by the rasteriser for further processing (e.g. shading, etc.) by the graphics processor. In this case, the smallest patch size in an embodiment corresponds to the patch size at which patches can be sample tested in the sample tester.

Patch sizes should, and in an embodiment do, refer to the area of the render output that the patch encompasses, and may be expressed in terms of number of fragments (pixels), i.e. in the same way as rendering tile sizes discussed above. In an embodiment, where the largest rendering tile size is 16×16 fragments (pixels), the largest supported patch size is also 16×16 fragments (pixels), and the one or more smaller rendering tile sizes include 8×8, 4×4 and 2×2. In an embodiment, where the largest rendering tile size is 32×32, the largest supported patch size is also 32×32, and the one or more smaller rendering tile sizes include 16×16, 8×8, 4×4, and 2×2. Thus, the smallest patch size is in an embodiment 2×2 fragments (pixels). Other arrangements would be possible.

The selection of the patch size at which to start rasterisation of the primitives for a render output can be based on the rendering tile size to be used in any suitable and desired manner.

The (control circuit of the) rasteriser can determine the rendering tile size being used for a render output in any suitable and desired manner.

In an embodiment, the (control circuit of the) rasteriser determines the rendering tile size that is to be used by reading information indicating the rendering tile size that is in an embodiment stored in (the) external memory, e.g. from a frame buffer descriptor. The information (frame buffer descriptor) is in an embodiment written to memory by a (the) driver for the graphics processor at the start of the rendering of the render output.

The patch size at which to begin the testing of primitives in the rasteriser should be selected from a (the) set of plural possible patch sizes that are supported by the rasteriser.

The selection should be, and in an embodiment is, such that the hierarchical rasterisation process, where possible, begins at a patch size that is smaller than the largest patch size supported by the rasteriser, so that patch tests involving the one or more largest supported patch sizes are, where possible, omitted.

As discussed above, the Applicants have recognised that it is possible to omit patch tests in which a primitive is tested against a patch that is larger than the size of the rendering tile size that is being used. Thus, in an embodiment, the selection is such that the hierarchical rasterisation process begins at a patch size that is smaller than or equal to the rendering tile size to be used, and thus such that any patch tests involving patches larger than the size of the rendering tile size to be used are omitted.

The Applicants have furthermore recognised, however, that beginning the hierarchical rasterisation process from a patch size that is too small may lead to an increase the overall number of patch tests performed. In an embodiment, therefore, the selection is such that the hierarchical rasterisation process begins at the closest patch size to the rendering tile size to be used (in the set of possible patch sizes) that is smaller than or equal to the rendering tile size that is to be used.

Thus, in an embodiment, where the rendering tile size to be used is the same as one of the supported patch sizes, then that patch size is selected. Where the rendering tile size to be used is not the same as any of the supported patch sizes, then the closest patch size that is smaller than the rendering tile size to be used is in an embodiment selected.

In an embodiment, each rendering tile size in the set of possible rendering tile sizes is associated with a patch size in the set of possible patch sizes that the rasteriser begins testing primitives from for that rendering tile size.

Once a patch size has been selected based on the rendering tile size to be used, primitives are rasterised by the rasteriser in a hierarchical manner beginning at the selected patch size. The rasteriser may also be operable to perform depth and/or stencil tests in a hierarchical manner (beginning at the selected patch size).

Thus, in an embodiment, the rasteriser, for each primitive to be rasterised for the render output, tests the primitive against a first patch of the render output that has the selected patch size to determine whether the primitive at least partially covers the first patch of the render output, and when it is determined that the primitive does at least partially cover the first patch of the render output, subdivides the first patch of the render output into a set of second, smaller patches of the render output that the first patch of the render output encompasses. The second smaller patches should, and in an embodiment do, have the next largest patch size in the set of possible patch sizes after the selected patch size.

Correspondingly, in an embodiment, the rasteriser, for each primitive to be rasterised for the render output, omits testing the primitive against any patches (in the set of possible patch sizes) that have a size that is larger than the selected patch size.

When it is not determined that the primitive does at least partially cover the first patch (when is determined that the primitive does not at least partially cover the first patch), the first patch is in an embodiment discarded, i.e. not subjected to further testing and subdivision.

Where the second, smaller patches do not have the smallest supported patch size, the rasteriser in an embodiment, for each primitive to be rasterised for the render output, for each second, smaller patch of the render output that the primitive was found to at least partially cover, tests the primitive against the respective second patch of the render output to determine whether the primitive at least partially covers the respective second patch of the render output, and when it is determined that the primitive does at least partially cover the respective second patch of the render output, subdivides the respective second patch of the render output into a set of third, (even) smaller patches of the render output that the respective second patch of the render output encompasses. The third smaller patches should, and in an embodiment do, have the next largest patch size in the set of possible patch sizes after the patch size that the second smaller patches have.

When it is not determined that the primitive does at least partially cover a respective second patch (when is determined that the primitive does not at least partially cover a respective second patch), the respective second patch is in an embodiment discarded, i.e. not subjected to further testing and subdivision.

Where the third, smaller patches do not have the smallest supported patch size, any such third patches that are covered by the primitive may be tested and subdivided or discarded in the same manner, and so on.

In an embodiment, the rasteriser is operable to perform depth and/or stencil tests in a hierarchical manner, such that a patch against which a primitive is tested can only be subjected to subdivision if the primitive passes a depth and/or stencil test in respect of the patch. Thus, a patch may also be discarded by the rasteriser as a result of a failed depth and/or stencil test.

This testing and subdivision process in an embodiment continues until all patches have been discarded or until the smallest supported patch size is reached. Thus, the final possible level of subdivision in an embodiment comprises subdividing a patch of the render output into a set of patches of the render output that have the smallest patch size and that the patch of the render output encompasses. Any such smallest sized patches that are found to be covered may then be patch tested (by the sample tester) to generate fragments for subsequent processing.

Thus, the method in an embodiment comprises (and the sample tester is correspondingly configured to), for each primitive to be rasterised for the render output, for each smallest patch of the render output that the primitive was found to at least partially cover, the (sample tester of the) rasteriser sample testing the respective smallest patch to determine which sampling points, and thus fragments, for that patch are covered by the primitive, and outputting the covered fragments for further processing (e.g. rendering (shading)) by the graphics processor.

The position within the render output of the first patch that testing begins at should depend on the position within the render output of the rendering tile that is being generated. The position of the first patch should be, and in an embodiment is, such that the first patch at which testing begins encompasses the rendering tile in question. Thus, in an embodiment, when generating a (and in an embodiment each) rendering tile of the render output: the rasteriser, for each primitive to be rasterised for the respective rendering tile, begins the testing of the primitive from a patch that has the selected patch size and which has a position corresponding to (e.g. encompassing) the respective rendering tile.

Any subsequently tested smaller patches for a rendering tile should be positioned such that they are encompassed by the first patch for that rendering tile. In an embodiment, the subdivision of a larger patch into a smaller patch is such that the larger patch is subdivided into quadrants, i.e. a larger patch is in an embodiment subdivided into a set of four non-overlapping, in an embodiment equally sized and shaped, smaller patches, wherein each smaller patch is encompassed by the larger patch, and in an embodiment has the same shape as, but a smaller size (area) than, the larger patch.

The testing of primitives can be caused to begin at the selected patch size in any suitable and desired manner.

In an embodiment, the rasteriser includes a set of queues for queuing patch tests to be performed by the rasteriser, wherein each queue queues patch tests to be performed for a particular patch size of the set of possible patch sizes. Thus, the rasteriser in an embodiment includes a queue for each of one or more of the patch sizes supported. There could be a queue for each and every supported patch size. In an embodiment, and as will be discussed below, however, the rasteriser handles largest and/or smallest patch sizes differently to other supported patch sizes. In this case, the rasteriser may include a queue for each supported patch size, except the largest and/or smallest patch size.

Each queue of the rasteriser in an embodiment queues queue items that each indicate a respective patch test to be performed by the rasteriser. Each queue item may, for example and in an embodiment, include an indication of a primitive and a position of a patch of the render output that the primitive is to be tested against. Each queue is in an embodiment provided as a FIFO queue.

In this case, the testing of a primitive is in an embodiment begun at the selected patch size by including a queue item for the primitive in a queue of the set of queues in accordance with the selected patch size. That is, a queue item is in an embodiment included in the queue for the selected patch size, and any queues for larger patch sizes may be, in effect, bypassed. This will then have the effect that the testing of the primitive begins at the selected patch size, and patch tests involving any larger sized patches are omitted.

This can be achieved as desired. In an embodiment, the (control circuit of the) rasteriser comprises a configurable circuit that can be configured to route input primitives to the desired queue of the set of queues. The configurable circuit may, for example, comprise a set of multiplexers that can be configured to route input primitives to the desired queue.

Where the rasteriser does not include a queue for the largest patch size, and the largest patch size is selected, an input primitive may be caused to begin at the largest patch size in the usual manner for the graphics processor, e.g. by being routed directly for patch testing.

Where the selected patch size is smaller than the rendering tile size being used, plural queue items are in an embodiment included in the appropriate (and the same) queue, wherein the plural queue items in an embodiment indicate the same primitive but different patch positions such that the plural queue items together cause the rasteriser to patch test the entire area of the rendering tile for the primitive.

In this case, the plural queue items for a primitive are in an embodiment arranged so as to minimise the number of queue items that are needed to test the primitive against the entire area of the rendering tile. For example and in an embodiment, the plural queue items indicate patch positions that are offset from each other such that the primitive will be tested against plural non-overlapping patches that each have the selected patch size, and in an embodiment such that the plural non-overlapping patches together cover (exactly) the same area of the render output as the rendering tile being generated. Thus, each of the plural queue items in an embodiment causes the rasteriser to patch test a respective fraction of a rendering tile.

For example, and in an embodiment, where the rendering tile size being used is a rectangle made up of two identical squares, and the set of supported patch sizes includes the same area as the square, two queue items are included in the queue for that patch size, wherein each queue item causes the rasteriser to patch test a respective half of the rendering tile. This will then have the effect that the entire non-square rendering tile is patch tested.

As will be appreciated by those skilled in the art, the graphics processor of the technology described herein may be part of an overall graphics processing system that includes, e.g., and in an embodiment, a host processor that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and in an embodiment does, also execute a driver for the graphics processor. The host processor may also execute a compiler or compilers for compiling programs to be executed by (e.g., a programmable processing stage (shader) of the) graphics processor.

The graphics processor may also comprise, and/or be in communication with, one or more memories and/or memory devices that store the data described herein, and/or the output data generated by the graphics processor, and/or store software (e.g. program) for performing the processes described herein. The graphics processor may also be in communication with a host microprocessor, and/or with a display for displaying images based on the data generated by the graphics processor.

The technology described herein can be used for all forms of output that a graphics processor may be used to generate. For example, the graphics processor may generate frames for display, render-to-texture outputs, etc. The output data values from the processing are in an embodiment exported to external, e.g. main, memory, for storage and use, such as to a frame buffer for a display.

In an embodiment, the various functions of the technology described herein are carried out on a single graphics processing platform that generates and outputs data (such as rendered fragment data that is, e.g., written to the frame buffer), for example for a display device.

The technology described herein can be implemented in any suitable system, such as a suitably configured microprocessor based system. In an embodiment, the technology described herein is implemented in a computer and/or micro-processor based system.

The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuit, processing logic, microprocessor arrangements, etc., that are operable to perform the various functions, etc., such as appropriately dedicated hardware elements (processing circuit) and/or programmable hardware elements (processing circuit) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits, etc., if desired.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, NVRAM (Non-Volatile RAM), SSD, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

FIG. 1 shows a graphics processing system in accordance with an embodiment, comprising a host processor (CPU) 1, a graphics processing unit (GPU) 3, and a memory 5 for storing data required by and/or generated by the host processor 1 and graphics processor 3.

When an application 2 that is executing on the host processor 1 requires graphics processing from the graphics processor 3, such as a frame to be displayed, the application 2 sends appropriate commands and data to a driver 4 for the graphics processor 3 that is running on the host processor 1. The driver 4 then sends appropriate commands and data to the graphics processor 3 to cause it to generate the render output required by the application 2. The driver 4 may send commands and data to the graphics processor 3 by writing to the memory 5 and/or communicate with the graphics processor 3 using a register interface of the graphics processor 3.

The commands and data provided by the driver 4 can include commands to render primitives for the render output to be generated by the graphics processor 3, together with associated vertex data representing the vertices to be used for the primitives for the render output.

The commands sent to the graphics processor 3 cause the graphics processor 3 to read the vertex data from the memory 5, and process the read vertex data to generate the render output. The graphics processor 3 can use the vertex data for a primitive to rasterise the primitive to one or more fragments each (potentially) applying to a region (area) of the render output. The fragments can then be rendered.

The completed render output (e.g. frame) may be written in a frame buffer in the memory 5, from where it may be provided for display on a display device, such as a screen or printer.

Figure 2:
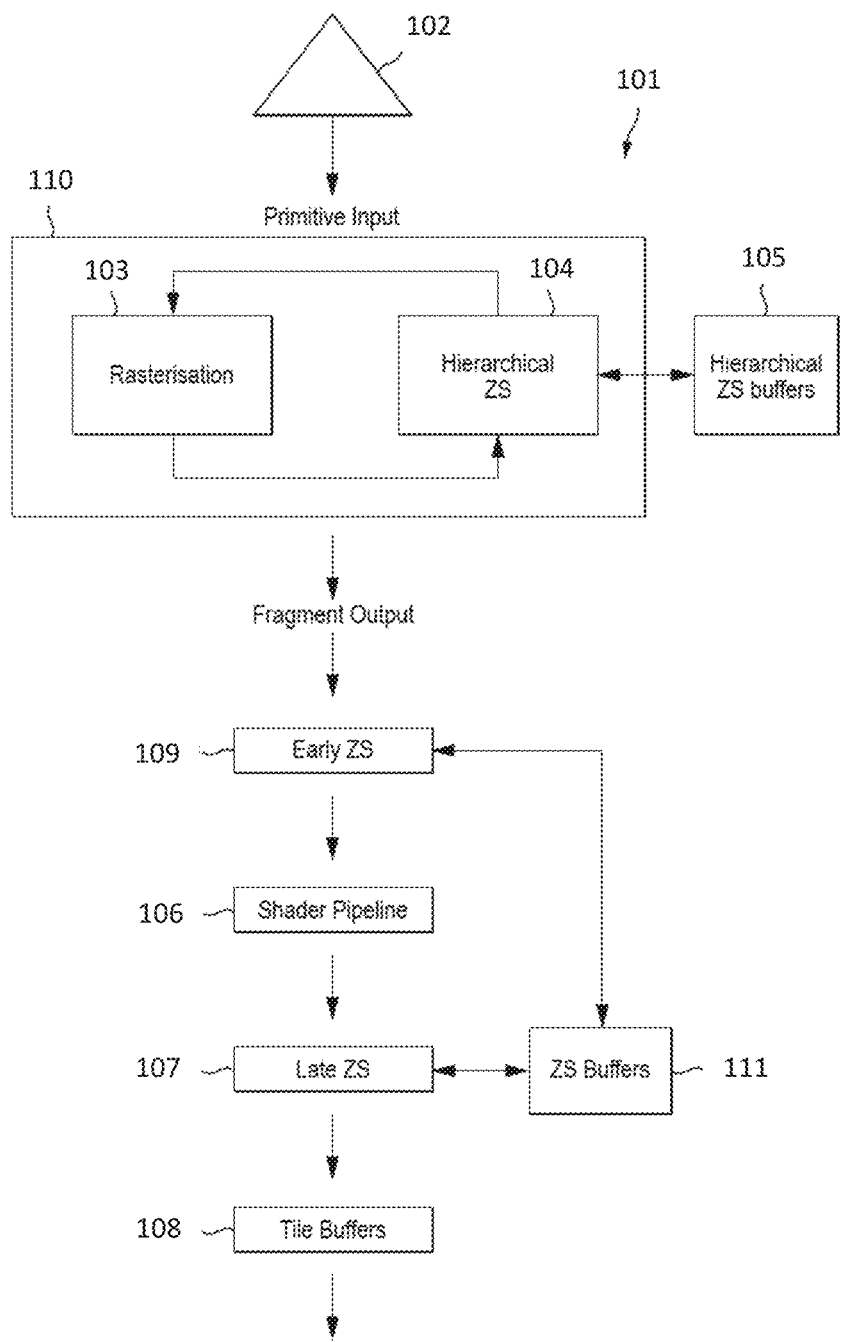
FIG. 2 shows schematically an embodiment of a graphics processing pipeline that can operate in accordance with an embodiment of the technology described herein.

FIG. 2 shows a graphics processing pipeline 101 that is executed by the graphics processor 3 in the present embodiment.

FIG. 2 shows the main elements and pipeline stages executed by the graphics processor 3 that are relevant to the operation of the present embodiment. As will be appreciated by those skilled in the art there may be other elements of the graphics processor 3 and pipeline 101 that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processor as shown in FIG. 2 may be implemented as desired and will accordingly comprise, e.g., an appropriate circuit and/or processing logic, etc., for performing the necessary operation and functions.

The graphics processing system of the present embodiment is a tile-based system. The graphics processor 3 executing the pipeline 101 will thus produce tiles of a render output data array, such as an output frame to be generated. The output data array may typically be an output frame intended for display on a display device, such as a screen or printer, but may also, for example, comprise a "render to texture" output of the graphics processor, etc.

In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

An advantage of such tile-based rendering is that graphics processing commands (primitives) that do not apply to a given tile do not have to be processed for that tile, and therefore can be ignored when the tile is processed. This allows the overall amount of graphics processing necessary for a given render output to be reduced. Moreover, external memory bandwidth can be significantly decreased, since, e.g., temporal and spatial locality is significantly increased.

In a tile-based rendering system, it is accordingly usually desirable to be able to identify and know those commands (primitives) that actually apply to a given rendering tile so as to, e.g., avoid unnecessarily processing commands and primitives that do not actually apply to a tile.

In order to facilitate this, in the present embodiment, lists of the primitives to be processed are prepared for different regions of the render output. These "primitive lists" (which can also be referred to as a "tile list" or "polygon list") identify (e.g. by reference to a primitive indicator) the primitives to be processed for the region in question. The regions of the render output that primitive lists can be prepared for can correspond e.g. to single rendering tiles, or to sets of plural rendering tiles. Once the primitive lists have been prepared for the render output regions, each rendering tile can then be processed by rasterising and rendering the primitives listed for the region(s) that encompass the rendering tile.

Any suitable and desired vertex shading operations may also be performed on the vertex data for the primitives. The vertex shading operations may operate to transform attributes for each vertex into a desired form for the subsequent graphics processing operations. This may comprise, for example, transforming vertex position attributes from the world or user space that they are initially defined for to the screen space that the output of the graphics processing system is to be displayed in, and lighting operations. The primitive lists and processed vertex data may then be stored in the memory 5.

FIG. 2 shows schematically the pipeline stages after the graphics primitives (polygons) 102 for input to the rasterisation process have been generated and sorted into primitive lists. Thus, at this point the graphics data (the vertex data) has undergone transformation and lighting operations (not shown), and a primitive set-up stage (not shown) has set-up the primitives to be rendered in response to the commands and vertex data provided to the graphics processor 3. Furthermore, a tiler (not shown) of the pipeline has generated appropriate primitive lists, and a fragment shader endpoint (not shown) of the pipeline has scheduled the rendering work that the graphics processing pipeline 101 needs to perform in order to generate a particular tile.

As shown in FIG. 2, this part of the fragment processing pipeline 101 of the graphics processor 3 includes a number of processing stages, including a rasteriser 110 that includes a rasterisation stage 103 and a hierarchical ZS (depth and stencil) test stage 104, an early ZS (depth and stencil) test stage 109, a rendering stage in the form of a fragment shading stage 106, and a late ZS (depth and stencil) test stage 107. The pipeline 101 also includes and/or has access to (is in communication with) appropriate memory for storing the data that the pipeline will use and/or generate, such as a hierarchical depth and stencil buffer(s) 105, depth and stencil buffer(s) 111, tile buffers 108, etc.

The tile buffer 108 is provided as part of RAM that is located on (local to) the graphics processor 3 (chip). The tile buffer 108 stores colour buffers that store an appropriate colour (and other appropriate data, such as Multiple Render Target data, e.g. a surface normal, etc.) for each sampling point that the buffers represent (in essence for each sampling point of a tile that is being processed). These buffers store an array of data that represents part (a tile) of the overall render output (e.g. frame to be displayed), with respective sets of sample values in the buffers corresponding to respective pixels of the overall render output (e.g. each 2×2 set of sample values may correspond to an output pixel, where 4× multisampling is being used).

The rasteriser 110 operates to rasterise the primitives making up the render output (e.g. the frame to be displayed) into individual graphics fragments for processing. To do this, the rasteriser 110 receives graphics primitives 102 to be rendered, rasterises the primitives to sampling points and generates graphics fragments having appropriate positions (representing appropriate sampling positions) for rendering the primitives. In the present embodiment, a graphics fragment that is generated by the rasteriser 110 can represent (have associated with it) a set of one or more, such as four, sampling positions. Each graphics fragment may have associated with it a coverage mask indicating which sampling points of the set of one or more sampling positions that the fragment represents, it is actually being used to render (i.e. are actually covered by the primitive in question).

In the present embodiment, the rasteriser 110 is a hierarchical rasteriser that may iteratively test primitives against progressively smaller patches (regions) of the render output (target) area (and thus, correspondingly, patches of fragments), down to a minimum patch size corresponding, in the present embodiment, to a 2×2 group of fragments (i.e. to an array of sampling points that would be rasterised to a 2×2 group of fragments), discarding any patches that are not (at least in part) covered by the primitive. Each patch that is tested corresponds to a given area of the render output, e.g. frame, being generated (and thus to a given set of fragments).

The rasterisation stage 103 of the rasteriser 110 performs this render output patch testing. To do this, it starts with a large patch of the render output area and tests the patch against the edges of the primitive in question to determine if the primitive completely covers the large patch or at least partially covers the large patch (i.e. at least partially covers any patch of a 2×2 set of smaller patches of the render output that the large patch is divided into (encompasses)).

The edges of the primitive are represented by appropriate line (edge) equations that have been derived from the vertices of the primitive, and a grid of sampling points is derived for the patch (and for each patch) being tested. The patch sampling points are then used with the line equations representing the edges of the primitive in question to perform an edge test for the edges to determine if the patch is at least partially covered by the primitive.

In the present embodiment, the rasterisation stage 103 determines that a patch of the render output is at least partially covered by a primitive if at least one of the following conditions is met: at least one edge of the patch is within the primitive; at least one edge of the patch is crossed by an edge of the primitive; at least one vertex of the primitive is within the patch; or at least one vertex of the primitive is on a patch edge and, if the vertex is on the patch edge, another vertex of the primitive is on another edge of the patch, or if the vertex is on a corner of the patch, another vertex is on the opposite corner or on one of the opposite edges of the patch.

The rasterisation stage determines that a large patch of the render output is completely covered by a primitive if that patch is found to entirely pass the edge test for each of (for all of) the edges of the primitive.

If it is found that the large patch is not covered by the primitive at all, then the patch is not processed further in respect of the primitive in question (i.e. the entire patch is discarded for the primitive in question), and another (the next) large patch may then be tested against the primitive, and so on.

On the other hand, if the primitive is found to at least partially cover the large (i.e. at least partially cover any of the smaller patches of the set of plural smaller patches of the render output that the large patch encompasses (is divided into)), then the large patch is forwarded by the rasterisation stage 103 to the hierarchical ZS testing stage 104. According to the outcome of the depth and stencil tests performed by the hierarchical test stage 104, the large patch may then be returned to the rasterisation stage 103 to be subdivided into its four smaller patches, with each covered such smaller patch ("sub-patch") then tested against the primitive and processed in the same way (i.e. discarded; or forwarded to the hierarchical depth testing stage 104 and later returned to the rasterisation stage 103 and subdivided into a set of smaller patches). This patch testing and discarding or subdivision is continued until the minimum patch size is reached.

The present embodiment supports five levels of subdivision (four sub-division iterations) and so can start with large patches having an area corresponding to 32×32 fragments, which are then (if appropriate) subdivided into four 16×16 fragment patches. Each of those 16×16 fragment patches is then subdivided into respective 8×8 fragment patches (if appropriate). Each of those 8×8 fragment patches is then subdivided into respective 4×4 fragment patches (if appropriate). Finally, each 4×4 fragment patch is subdivided into respective 2×2 fragment patches (if appropriate). As in the present embodiment, a 2×2 fragment patch is the minimum patch size that is used, the (potential) subdivision process stops at this point. Other arrangements would, of course, be possible.

Figure 3:
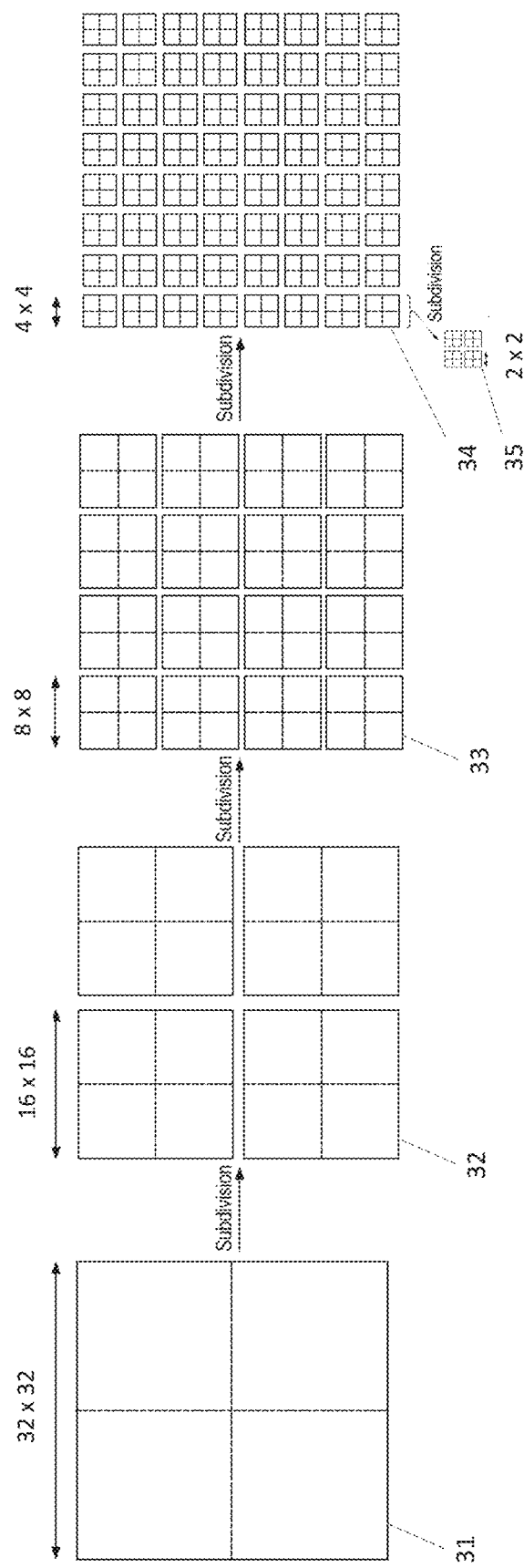
FIG. 3 illustrates the sub-division process that is used by the rasteriser in the described embodiment of the technology described herein.

FIG. 3 illustrates the subdivision process of the present embodiment and shows how a top level, 32×32 fragment, patch 31 can be progressively subdivided down to the minimum patch size of 2×2 fragments. As shown in FIG. 3, the 32×32 fragment patch 31 can be subdivided into a set of four 16×16 fragment patches 32. Each such 16×16 fragment patch 32 can be subdivided into a respective set of four 8×8 fragment patches 33. Each such 16×16 fragment patch 33 can be subdivided into a respective set of four 4×4 fragment patches 34. Finally, each such 4×4 fragment patch 34 can be subdivided into a respective set of four 2×2 fragment patches 35.

Once the minimum patch size has been reached (i.e. a patch of 2×2 fragments that covers, at least in part, the primitive has been identified), the rasterisation stage 103 then tests the individual sampling points in that final patch to see if the sampling points are covered by the primitive. The rasteriser 110 then generates and outputs individual fragments for rendering corresponding to the sampling points found to be covered by the primitive (so four fragments if all the 2×2 fragments in the minimum size patch are at least partially covered by the primitive).

The rasteriser 110 also associates with each fragment a coverage mask in the form of a bitmap that indicates, for each sample position of the set of one or more sample positions that is associated with the fragment, whether that sample position is covered (i.e., in effect, whether the fragment is being used to render that sampling point (i.e. whether its data should be stored for that sampling point)).

In the present embodiment, a primitive to be rasterised can be tested beginning from a patch that falls within (is covered by) a bounding box generated for the primitive.

Once a primitive has been tested in this manner, then the rasterisation process moves on to the next primitive for the tile being generated and so on, until all the primitives for the tile in question have been rasterised.

The process then moves on to the next tile to be generated, and so on.

Once all the primitives for the render output in question have been rasterised, the process then moves on to the next render output, e.g. frame, to be generated, and so on.

The rasteriser 110 is configured in the present embodiment as a pipeline that can contain and process plural patches at the same time. The rasteriser 110 is also configured to be able to generate plural fragments at a time (simultaneously) (e.g. where a primitive is found to completely cover a patch of the render output that encompasses plural fragments (e.g. plural sampling points or sets of sampling points)). The fragments are still processed individually by the fragment processing parts of the pipeline, such as the renderer (fragment shader). Having the rasteriser produce plural fragments simultaneously helps to create back pressure to thereby keep the rendering pipeline "filled up" with fragments.

Other arrangements would, of course, be possible.

Figure 4:
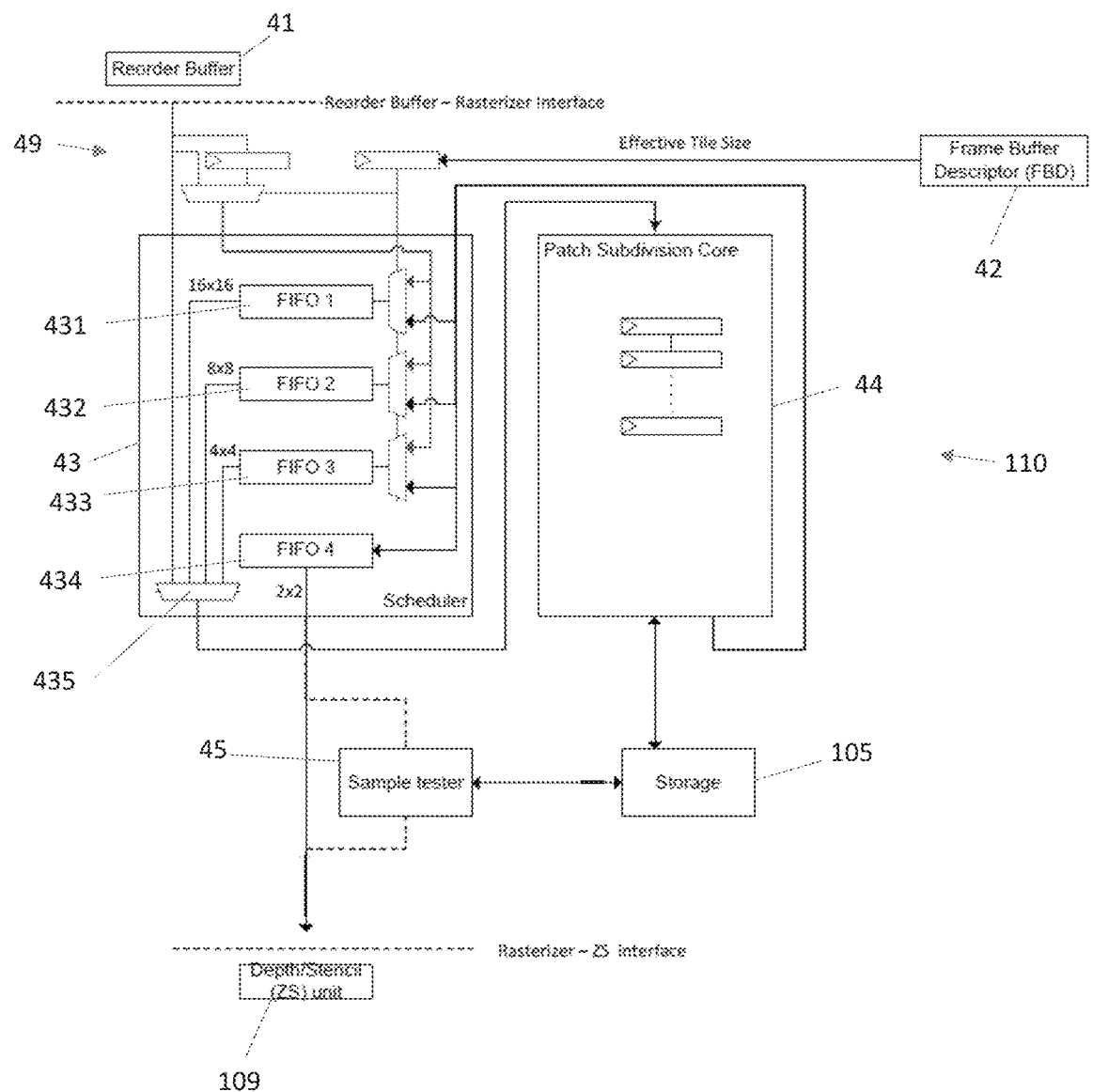
FIG. 4 shows the rasteriser in the described embodiment of the technology described herein.

FIG. 4 shows the rasteriser 110 of the present embodiment in more detail. FIG. 4 shows the main elements of the rasteriser 110 that are relevant to the operation of the present embodiment. As will be appreciated by those skilled in the art there may be other elements of the rasteriser 110 that are not illustrated in FIG. 4.

As shown in FIG. 4, the rasteriser 110 receives primitives 102 to be rasterised from a reorder buffer 41 of the graphics processing pipeline 101. The reorder buffer 41 can operate to reorder input primitives 102 into an order that is suitable for subsequent processing by the rasteriser 110.

Primitives 102 received from the reorder buffer 41 are subjected to a hierarchical rasterisation process. To do this, the rasteriser 110 includes a patch subdivision core (PSC) 44 which tests primitives against patches and subdivides larger patches into smaller patches (if appropriate), and a scheduler 43 which schedules primitives for testing by the patch subdivision core (PSC) 44.

In the present embodiment, the patch subdivision core (PSC) 44 is also operable to perform appropriate hierarchical depth and stencil tests, e.g. as discussed above, and is in communication with the hierarchical depth and stencil buffer(s) 105 for this purpose.

As shown in FIG. 4, the scheduler 43 includes a multiplexer 435 that can select a primitive for testing by the patch subdivision core (PSC) 44 from the reorder buffer 41 or from one of queues, FIFO 1-3 431, 432, 433, and cause the patch subdivision core (PSC) 44 to test the selected primitive against an appropriate patch of the render output.

For a primitive received directly from the reorder buffer 41, the multiplexer 435 causes the patch subdivision core (PSC) 44 to test that primitive against a top level, 32×32 fragment, patch. For a primitive received from FIFO 1 431, the multiplexer 435 causes the patch subdivision core (PSC) 44 to test that primitive against a 16×16 fragment patch. For a primitive received from FIFO 2 432, the multiplexer 435 causes the patch subdivision core (PSC) 44 to test that primitive against an 8×8 fragment patch. For a primitive received from FIFO 3 433, the multiplexer 435 causes the patch subdivision core (PSC) 44 to test that primitive against a 4×4 fragment patch.

The patch subdivision core (PSC) 44, upon receiving a primitive to be tested against a patch from the multiplexer 435, tests the primitive against the patch, and (if appropriate) subdivides the patch into four smaller patches. The patch subdivision core (PSC) 44 returns any of the smaller patches that the primitive is found to cover to the scheduler 43 to be scheduled for further testing.

In the case of a 32×32 fragment patch, the patch subdivision core (PSC) 44 (if appropriate) subdivides the 32×32 fragment patch into four 16×16 fragment patches, and (if appropriate) returns 16×16 fragment patches to the scheduler 43. In the case of a 16×16 fragment patch, the patch subdivision core (PSC) 44 (if appropriate) subdivides the 16×16 fragment patch into four 8×8 fragment patches, and returns (if appropriate) 8×8 fragment patches to the scheduler 43. In the case of a 8×8 fragment patch, the patch subdivision core (PSC) 44 (if appropriate) subdivides the 8×8 fragment patch into four 4×4 fragment patches, and (if appropriate) returns 4×4 fragment patches to cover to the scheduler 43. In the case of a 4×4 fragment patch, the patch subdivision core (PSC) 44 (if appropriate) subdivides the 4×4 fragment patch into four 2×2 fragment patches, and (if appropriate) returns 2×2 fragment patches to the scheduler 43.

In response to receiving a patch for further testing from the patch subdivision core (PSC) 44, the scheduler 43 adds a corresponding queue item to the appropriate queue. Each queue item indicates the primitive to be tested and the position of the patch of the render output that the primitive is to be tested against (with the size and shape of the patch being indicated by the queue that the queue item is queued in).

In the case of a 16×16 fragment patch received from the patch subdivision core (PSC) 44, the scheduler 43 adds a corresponding queue item to FIFO 1 431, so that the primitive can be subsequently selected by the multiplexer 435 and returned to the patch subdivision core (PSC) 44 for further testing and patch subdivision, as appropriate. Similarly, in the case of an 8×8 fragment patch, the scheduler 43 adds a corresponding queue item to FIFO 2 432, and in the case of a 4×4 fragment patch, the scheduler 43 adds a corresponding queue item to FIFO 3 433, so that the primitive can be subsequently selected by the multiplexer 435 and returned to the patch subdivision core (PSC) 44 for further testing and patch subdivision, as appropriate.

In the case of a 2×2 fragment patch received from the patch subdivision core (PSC) 44, however, the scheduler 43 adds a corresponding queue item to FIFO 4 434.

Each queue item in FIFO 4 434 is output by the scheduler 43 to sample tester 45. The sample tester 45 operates to test the individual sampling points in a 2×2 fragment patch it has received to see if the sampling points are covered by the primitive, and to generate individual fragments for rendering corresponding to the sampling points found to be covered by the primitive. As shown in FIG. 4, the sample tester also performs appropriate hierarchical depth and stencil tests, and is in communication with the hierarchical depth and stencil buffer(s) 105 for this purpose.

Fragments generated by the sample tester 45 pass to the early ZS (depth and stencil) test stage 109 of the pipeline 101 for further processing. This further processing includes fragment shading, i.e. determining sets of colour value data for fragment, with the colour value data being stored in the tile buffer 108 until a tile is completed. Completed tiles are then exported to a frame buffer in main memory 5.

As discussed above, it is sometimes desired to render a frame using a rendering tile size that is smaller than the rendering tile size that is natively supported by the graphics processor 3. For example, in the present embodiment, the tile buffer 108 is configured to be able to store rendered data for (only) a 32×32 array of sampling points using a 32 bit colour representation. The tile buffer 108 can thus (only) store rendered data for a single rendering tile of 32×32 fragments when each fragment represents (only) a single 32 bit colour for (only) a single sampling point.

In some rendering modes, such as multisampling, however, the number of sampling points that each fragment represents can be greater than one, and thus more storage capacity can be required to store data for a single 32×32 fragment tile than is physically available in the tile buffer 108. Similarly, it may sometimes be desired to use a higher bit representation, or render to multiple render targets. In such cases, the graphics processor 3 can use a smaller rendering tile size to avoid the storage limitations of the tile buffer 108.

Figure 5:
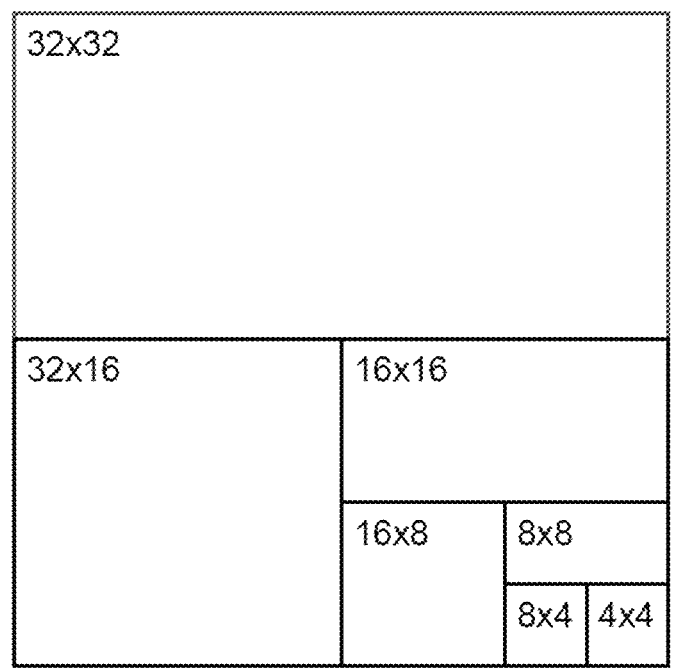
FIG. 5 illustrates the possible rendering tile sizes that the graphics processor in the described embodiment of the technology described herein can use.

FIG. 5 shows the possible rendering tile sizes that the graphics processor 3 of the present embodiment can use to generate an output frame. As shown in FIG. 5, the graphics processor 3 can render a frame using the largest supported 32×32 fragment tile size, or using a smaller tile size. The smaller tile sizes that the graphics processor 3 can use include square 16×16, 8×8, and 4×4 tiles, and non-square 32×16, 16×8, and 8×4 tiles. Thus, in the present embodiment the graphics processor 3 can use rendering tiles that are squares or rectangles made up of two equal squares. Other arrangements would be possible.

In the present embodiment, the driver 4 determines the rendering tile size that should be used to generate a frame, and writes information indicating the rendering tile size to use to a frame buffer descriptor 42 in memory 5 at the start of each frame. The driver 4 determines the rendering tile size based on the size of the tile buffer, and the per-tile storage requirements for the rendering mode to be used.

The Applicants have recognised that when using a rendering tile size that is smaller than the largest rendering tile size supported by the graphics processor, it is possible to increase the efficiency with which hierarchical rasterisation can be performed without impacting the correct functioning of the hierarchical rasterisation process. In particular, starting the hierarchical rasterisation process from a patch having a size that corresponds to the rendering tile size that is being used (rather than e.g. always starting the hierarchical rasterisation process from a top level (e.g. 32×32) patch irrespective of the rendering tile size that is actually being used) can result in one or more tests against larger sized patches being omitted, and thus the overall number of patch tests performed by the rasteriser reduced.

To facilitate this operation, as shown in FIG. 4, the rasteriser 110 includes control logic 49 that is configured to read the information indicating the rendering tile size that is being used from the frame buffer descriptor 42 stored in main memory 5, and that comprises a set of multiplexers for directing primitives 102 received from the reorder buffer 41 based on the rendering tile size read from the frame buffer descriptor 42.

If the frame buffer descriptor 42 indicates that a 32×32 fragment tile size is being used, then the primitives for that frame are directed so as to be processed by the rasteriser 110 in the manner discussed above. That is, the primitives are first tested against a highest level 32×32 fragment patch, and so on, as appropriate.

When, however, the frame buffer descriptor 42 indicates that another, i.e. smaller, rendering tile size is being used, then the primitives for that frame are directed by the control logic 49 to one of the scheduler queues based on the rendering tile size indicated by the frame buffer descriptor 42. Thus, primitives can, in effect, bypass one or more levels of subdivision or one or more of the queues.

In particular, when the frame buffer descriptor 42 indicates that a 16×16 fragment tile size is being used, the control logic 49 includes a queue item for the primitive in FIFO 1 431. When the frame buffer descriptor 42 indicates that an 8×8 fragment tile size is being used, the control logic 49 includes a queue item for the primitive in FIFO 2 432. When the frame buffer descriptor 42 indicates that a 4×4 fragment tile size is being used, the control logic 49 includes a queue item for the primitive in FIFO 3 433. This has the effect primitives 102 received from the reorder buffer 41 are tested beginning from a patch having a size corresponding to the rendering tile size being used, and one or more levels of testing and subdivision are omitted.

Figure 6:
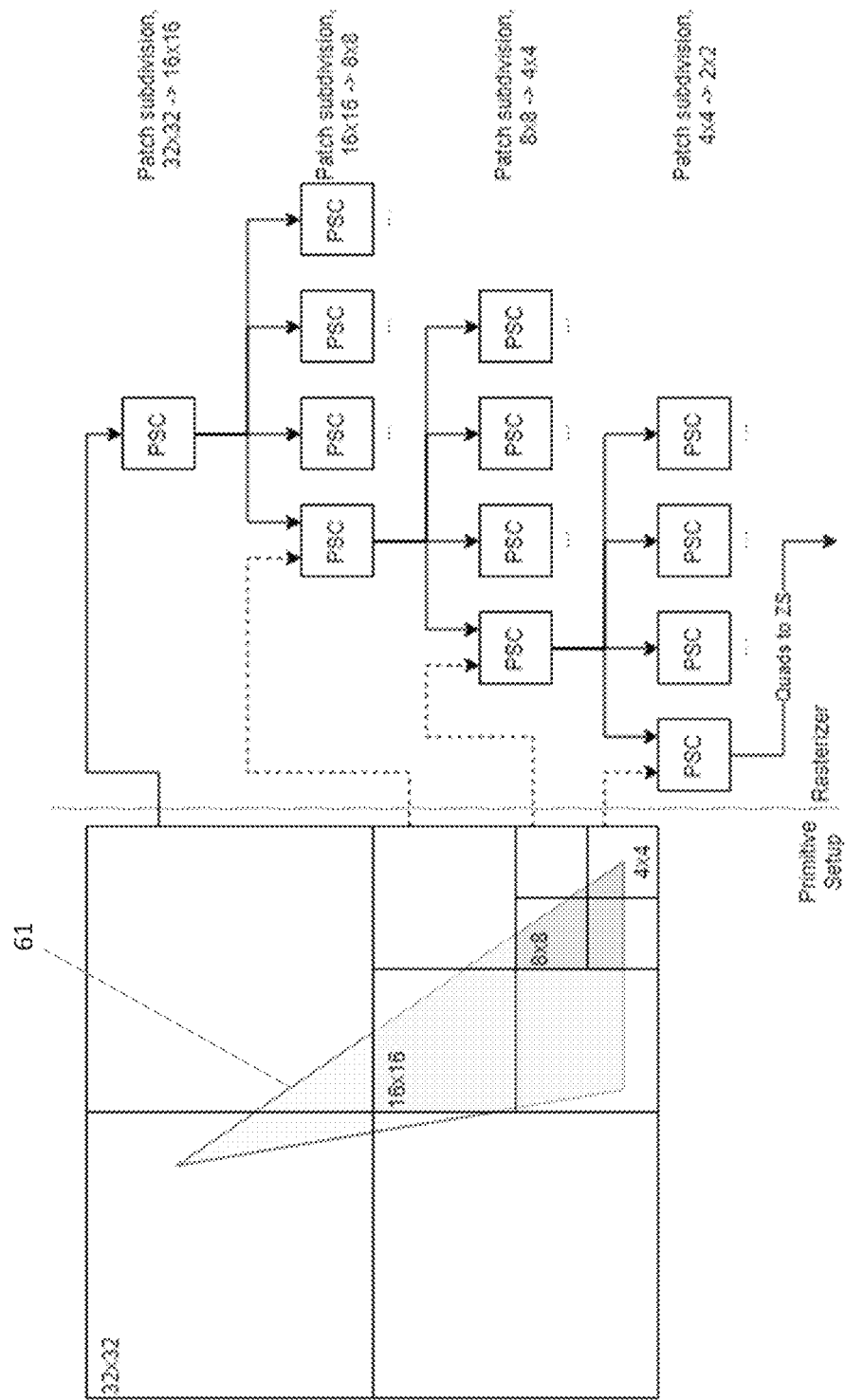
FIG. 6 shows a primitive being rasterised in an embodiment of the technology described herein.

FIG. 6 shows an exemplary primitive 61 to be rasterised according to an embodiment. As illustrated in FIG. 6, when the primitive 61 is to be rendered using a 32×32 fragment tile size, the primitive 61 is first passed to the patch subdivision core (PSC) 44 for testing against a top level 32×32 fragment patch. The primitive 61 may then be tested against smaller 16×16, 8×8 and 4×4 fragment patches, as appropriate.

When the primitive 61 is to be rendered using a 16×16 fragment tile size, however, a queue item for the primitive 61 is included in FIFO 1 431, thereby bypassing the top level of testing and subdivision. The primitive 61 is thus first tested by the patch subdivision core (PSC) 44 against a 16×16 fragment patch, and testing against a 32×32 fragment patch is omitted. The primitive 61 may then be tested against smaller 8×8 and 4×4 fragment patches, as appropriate.

Similarly, when the primitive 61 is to be rendered using an 8×8 fragment tile size, a queue item for the primitive 61 is included in FIFO 2 432, thereby bypassing the top and next levels of testing and subdivision. The primitive 61 is thus first tested by the patch subdivision core (PSC) 44 against an 8×8 fragment patch, and testing against 32×32 and 16×16 fragment patches is omitted. The primitive 61 may then be tested against smaller 4×4 fragment patches, as appropriate.

When the primitive 61 is to be rendered using a 4×4 fragment tile size, a queue item for the primitive 61 is included in FIFO 3 433, thereby bypassing the top and next two levels of subdivision. The primitive 61 is thus first tested by the patch subdivision core (PSC) 44 against a 4×4 fragment patch, and testing against 32×32, 16×16 and 8×8 fragment patches is omitted.

In the case of a non-square rendering tile size being indicated by the frame buffer descriptor 42, it would be possible to begin patch testing from a patch size that encompasses the non-square rendering tile. For example, when a primitive is to be rendered using a 32×16 rendering tile, it would be possible to begin patch testing of the primitive from a 32×32 fragment patch. However, the Applicants have recognised that in the case of non-square rendering tiles it is possible to reduce the overall number of tests performed by instead beginning patch testing from the next level of patch subdivision. In this case, two queue items are included in an appropriate queue of the scheduler 43 by the control logic 49, with each queue item then causing the patch subdivision core (PSC) 44 to test a respective half of the rendering tile.

For example, when the primitive 61 is to be rendered using a 32×16 fragment tile size, two queue items are included in FIFO 1 431, such that one of the two queue items causes the patch subdivision core (PSC) 44 to test a first 16×16 half of the tile, and the other of the queue items causes the patch subdivision core (PSC) 44 to test the other 16×16 half of the tile. The primitive 61 is thus first tested by the patch subdivision core (PSC) 44 against a 16×16 fragment patch, and testing against a 32×32 fragment patch is omitted.

In this way, one or more iterations of the hierarchical rasterisation process can be omitted.

Figure 7:
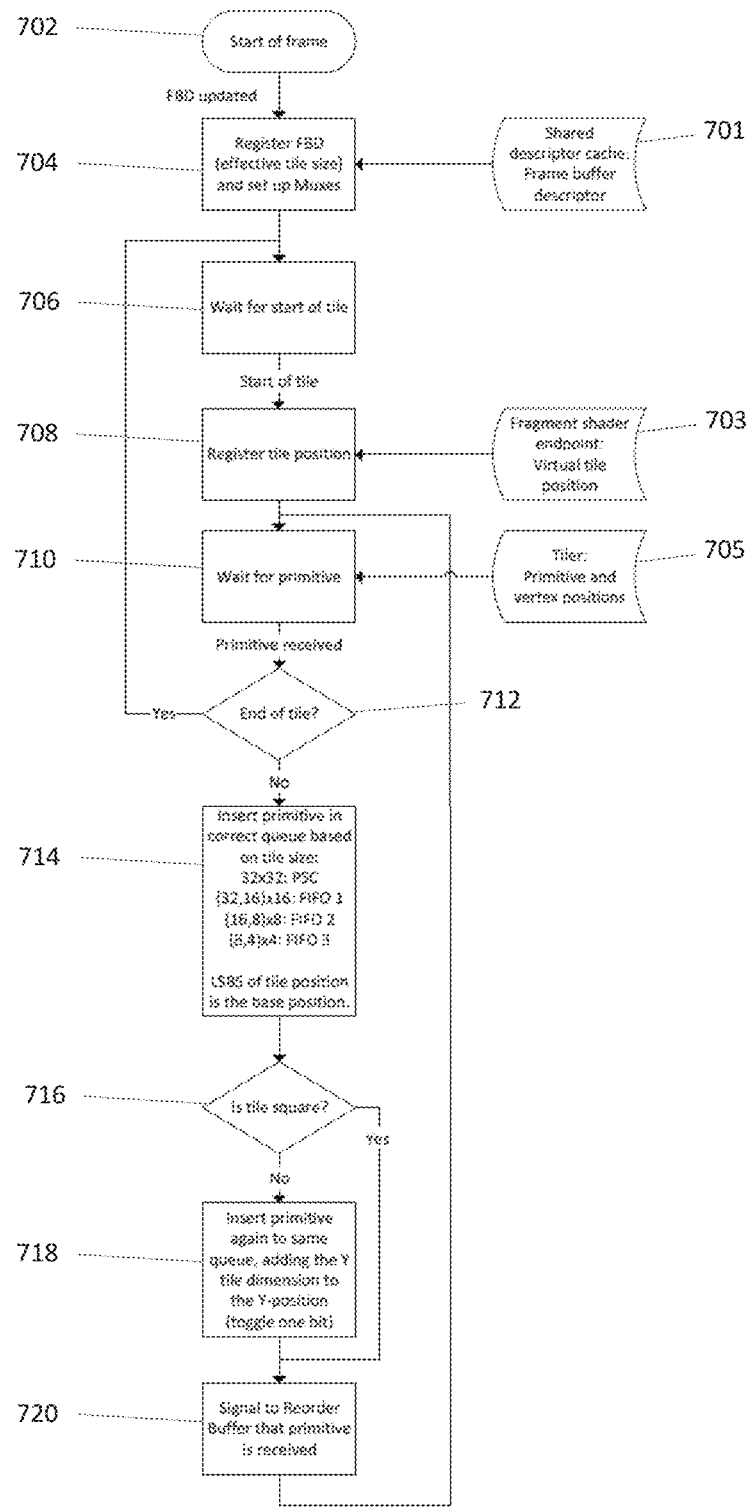
FIG. 7 shows a process in accordance with an embodiment of the technology described herein.

FIG. 7 illustrates a process according to an embodiment of the technology described herein.

As shown in FIG. 7, when (at step 702) a new frame (render output) is to be rendered, the driver 4 updates the frame buffer descriptor (FBD) 42 appropriately with information associated with the frame to be rendered, including the rendering tile size that is to be used to render the frame. The control logic 49 of the rasteriser 110 then (at step 704) reads the frame buffer descriptor (FBD) information from the descriptor cache 701 in memory 5, and configures the multiplexers of the control logic 49 to route primitives received from the reorder buffer 41 in accordance with the rendering tile size indicated by the read information.

Then, when (at step 706) a new rendering tile of the render output is to be generated, the rasteriser 110 receives (at step 708) information indicating the position of the tile to be rendered from the fragment shader endpoint 703. This information is used by the rasteriser 110 to determine appropriate positions of patches to use to test primitives for the rendering tile.

Then, when (at step 710) a primitive to be rendered for the rendering tile is to be rasterised, the rasteriser 110 receives vertex positions for the primitive from the tiler 705.

If (at step 712) a primitive for a next tile is received, the process returns to step 706 to begin processing the next tile. Otherwise, the primitive may be forwarded directly to the patch subdivision core (PSC) 44 or a queue item inserted (at step 714) into a queue of the scheduler 43 depending on the rendering tile size indicated by the frame buffer descriptor (FBD) information.

In particular, when a 32×32 rendering tile size is being used, the primitive is initially routed directly to the patch subdivision core (PSC) 44 for testing against a top level 32×32 fragment patch. When a 32×16 or 16×16 rendering tile size is being used, a queue item is included in FIFO 1 431 for causing a 16×16 fragment patch test. When a 16×8 or 8×8 rendering tile size is being used, a queue item is included in FIFO 432 for causing an 8×8 fragment patch test. When an 8×4 or 4×4 rendering tile size is being used, a queue item is included in FIFO 3 433 for causing a 4×4 fragment patch test.

If (at step 716) it is determined that a non-square (rectangular) rendering tile size is being used, then a duplicate queue item is inserted (at step 718) into the appropriate queue. In this case, the two queue items are associated with patches that are offset from each other so as to cover the entire rendering tile.

The primitive will then be rasterised by the rasteriser 110 performing hierarchical rasterisation beginning from a patch size that corresponds to the rendering tile size that is being used.

Then (at step 720), it is signalled to the reorder buffer 41 that the rasteriser 110 is ready to accept the next primitive for processing. The reorder buffer 41 may then provide the next primitive for processing to the rasteriser 110, and the process may continue from step 710 to process the new primitive.

Once each primitive to be rasterised for a rendering tile has been processed, the process may move on to the next tile of the frame. Once the processing for all rendering tiles of a frame has been completed, the process may move on to the next frame, beginning from step 702, and so on.

It will be appreciated from the above that the technology described herein, in its embodiments at least, provides arrangements in which the processing required to rasterise primitives in a tile-based graphics processor can be reduced. This is achieved, in the embodiments of the technology described herein at least, by the rasteriser iteratively testing a primitive against progressively smaller sized patches beginning from a patch that has a size that corresponds to the rendering tile size that is being used.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a tile-based graphics processor that is operable to generate a render output by generating a plurality of rendering tiles that together form the render output, and in which the rendering tile size to be used when generating a render output can be selected from a largest rendering tile size and one or more smaller rendering tile sizes;

wherein the tile-based graphics processor comprises a rasteriser that is operable to test primitives to be rasterised against progressively smaller patches having sizes from a set of plural possible patch sizes that includes a largest patch size and one or more smaller patch sizes;

the method comprising, when generating a render output:

selecting, based on the rendering tile size to be used when generating the render output, a patch size of the set of plural possible patch sizes at which to begin the testing of primitives for the render output in the rasteriser; and the rasteriser, for each primitive to be rasterised for the render output:

beginning the testing of the primitive at the patch size of the set of plural possible patch sizes selected based on the rendering tile size to be used when generating the render output; and omitting testing the primitive at any patch size of the set of plural possible patch sizes that is larger than the patch size of the set of plural possible patch sizes selected based on the rendering tile size to be used when generating the render output.

2. The method of claim 1, wherein the tile-based graphics processor comprises a local tile buffer, and the largest rendering tile size corresponds to the largest rendering tile that can be accommodated in the tile buffer.

3. The method of claim 1, further comprising the rasteriser determining the rendering tile size to be used by reading stored information that indicates the rendering tile size to be used.

4. The method of claim 1, wherein selecting the patch size comprises selecting the patch size in the set of plural possible patch sizes that is closest to, but not larger than, the rendering tile size be used when generating the render output.

5. The method of claim 1, wherein the rasteriser comprises a set of queues operable to queue tests to be performed by the rasteriser, wherein each queue is operable to queue tests for a respective patch size of the set of plural possible patch sizes, and wherein the rasteriser beginning the testing of a primitive at the selected patch size comprises including a queue item for the primitive in the queue of the set of queues for the selected patch size.

6. The method of claim 5, wherein the rasteriser comprises a configurable circuit operable to route primitives to queues of the set of queues, and wherein including a queue item for the primitive in the queue of the set of queues for the selected patch size comprises configuring the configurable circuit to route the primitive to the queue for the selected patch size.

7. The method of claim 5, comprising including plural queue items for the primitive in the same queue when the selected patch size is smaller than the rendering tile size to be used.

8. The method of claim 7, wherein the plural queue items cause the rasteriser to test the primitive against plural non-overlapping patches that each have the selected patch size and that together cover the same area of the render output as a rendering tile being generated.

9. A tile-based graphics processor that is operable to generate a render output by generating a plurality of rendering tiles that together form the render output, and in which the rendering tile size to be used when generating a render output can be selected from a largest rendering tile size and one or more smaller rendering tile sizes, the tile-based graphics processor comprising:

a rasteriser operable to test primitives to be rasterised against progressively smaller patches having sizes from a set of plural possible patch sizes that includes a largest patch size and one or more smaller patch sizes; and a control circuit configured to select, based on the rendering tile size to be used when generating a render output, a patch size of the set of plural possible patch sizes at which to begin the testing of primitives for the render output in the rasteriser; and to cause the rasteriser to:

begin the testing of a primitive for the render output at the patch size of the set of plural possible patch sizes selected based on the rendering tile size to be used when generating the render output; and omit testing the primitive at any patch size of the set of plural possible patch sizes that is larger than the patch size of the set of plural possible patch sizes selected based on the rendering tile size to be used when generating the render output.

10. The tile-based graphics processor of claim 9, wherein the tile-based graphics processor comprises a local tile buffer, and the largest rendering tile size corresponds to the largest rendering tile that can be accommodated in the tile buffer.

11. The tile-based graphics processor of claim 9, wherein the control circuit is configured to determine the rendering tile size to be used by reading stored information that indicates the rendering tile size to be used.

12. The tile-based graphics processor of claim 9, wherein the control circuit is configured to select the patch size in the set of plural possible patch sizes that is closest to, but not larger than, the rendering tile size to be used when generating the render output.

13. The tile-based graphics processor of claim 9, wherein the rasteriser comprises a set of queues operable to queue tests to be performed by the rasteriser, wherein each queue is operable to queue tests for a respective patch size of the set of plural possible patch sizes, and wherein the control circuit is configured to cause a queue item for a primitive to be included in the queue of the set of queues for the selected patch size.

14. The tile-based graphics processor of claim 13, wherein the control circuit comprises a configurable circuit operable to route primitives to queues of the set of queues, and a circuit configured to configure the configurable circuit to route primitives to the queue for the selected patch size.

15. The tile-based graphics processor of claim 13, wherein the control circuit is configured to cause plural queue items for a primitive to be included in the same queue when the selected patch size is smaller than the rendering tile size to be used.

16. The tile-based graphics processor of claim 15, wherein the plural queue items are configured to cause the rasteriser to test the primitive against plural non-overlapping patches that each have the selected patch size and that together cover the same area of the render output as a rendering tile being generated.

17. A non-transitory computer readable medium storing software code which when executing on a processor performs a method of operating a tile-based graphics processor that is operable to generate a render output by generating a plurality of rendering tiles that together form the render output, and in which the rendering tile size to be used when generating a render output can be selected from a largest rendering tile size and one or more smaller rendering tile sizes;

wherein the tile-based graphics processor comprises a rasteriser that is operable to test primitives to be rasterised against progressively smaller patches having sizes from a set of plural possible patch sizes that includes a largest patch size and one or more smaller patch sizes;

the method comprising, when generating a render output:

selecting, based on the rendering tile size to be used when generating the render output, a patch size of the set of plural possible patch sizes at which to begin the testing of primitives for the render output in the rasteriser; and the rasteriser, for each primitive to be rasterised for the render output:

beginning the testing of the primitive at the patch size of the set of plural possible patch sizes selected based on the rendering tile size to be used when generating the render output; and omitting testing the primitive at any patch size of the set of plural possible patch sizes that is larger than the patch size of the set of plural possible patch sizes selected based on the rendering tile size to be used when generating the render output.

* * * * *